US007356340B2

(12) United States Patent
Hamilton

(10) Patent No.: US 7,356,340 B2
(45) Date of Patent: Apr. 8, 2008

(54) SYSTEM AND METHOD FOR WIRELESS COVERAGE DETECTION

(75) Inventor: Bruce Hamilton, Menlo Park, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 398 days.

(21) Appl. No.: 10/909,814

(22) Filed: Aug. 2, 2004

(65) Prior Publication Data

US 2006/0025142 A1 Feb. 2, 2006

(51) Int. Cl.
*H04Q 7/20* (2006.01)

(52) U.S. Cl. ............... 455/446; 455/67.1; 455/423; 455/424; 455/425; 455/447; 702/189; 702/190; 702/191; 702/193; 702/194; 702/195

(58) Field of Classification Search ............ 455/67.1, 455/423, 424, 425, 446, 447; 702/189, 190, 702/191, 193, 194, 195
See application file for complete search history.

(56) References Cited

U.S. PATENT DOCUMENTS

| | | | |
|---|---|---|---|
| 6,006,089 | A | 12/1999 | Sasaki et al. |
| 6,266,514 | B1 | 7/2001 | O'Donnell |
| 6,308,071 | B1 * | 10/2001 | Kalev ................. 455/446 |
| 6,480,718 | B1 * | 11/2002 | Tse ..................... 455/446 |
| 6,708,036 | B2 * | 3/2004 | Proctor et al. ......... 455/446 |
| 2002/0042268 | A1 | 4/2002 | Cotanis |
| 2003/0008619 | A1 * | 1/2003 | Werner ................ 455/67.1 |
| 2003/0061009 | A1 * | 3/2003 | Davis et al. ........... 702/189 |

FOREIGN PATENT DOCUMENTS

DE     195 33 472     3/1997

OTHER PUBLICATIONS

Morris, Robert, "Counting Large Numbers of Events in Small Registers," Programming Techniques, Dec. 1977, 841-842.
Samet, Hanan, "Hierarchical Representations of Collections of Small Rectangles," ACM Computing Surveys, vol. 20, No. 4, Dec. 1988, 271-281.
European Search Report dated Dec. 20, 2005.

* cited by examiner

*Primary Examiner*—Steve M. D'Agosta

(57) ABSTRACT

A system and method is shown for determining the spatial boundary of certain measurable phenomena, such as broadcast signals, at various locations within geographical areas covered by the phenomenon. Data representing relative signal quality at various locations within the geographical area is created within a mobile device, such as a cell phone capable of receiving the phenomenon. The data is stored and refined within the device so as to define weak signal quality areas within at least a portion of the geographical area traveled by the mobile device. The refinement, which in one embodiment comprises coalescing and splitting stored data locations in the device allows for long storage periods by reducing memory requirements. By devoting the majority of memory to locations in the vicinity of the good/bad boundary, the most detailed picture possible of the boundary is achieved for a given amount of memory. By collecting such data from a plurality of such devices, a central system can map the signal strength over the entire geographical area.

22 Claims, 9 Drawing Sheets

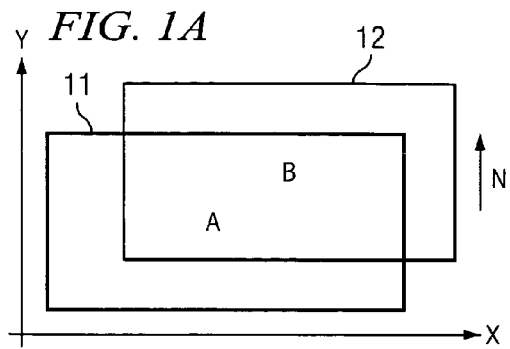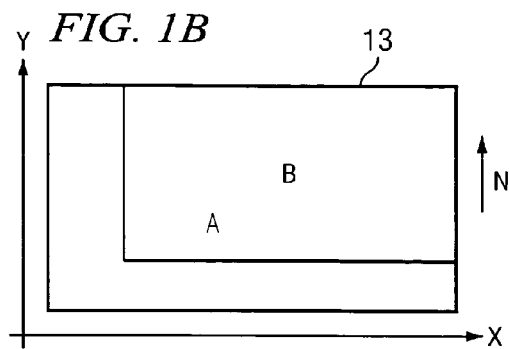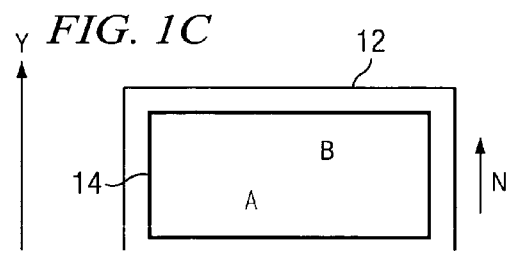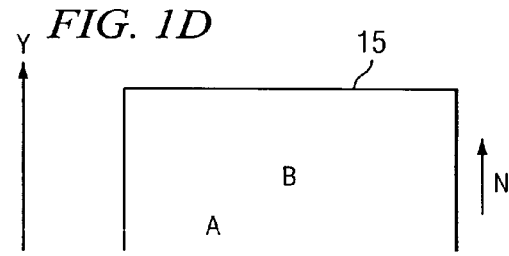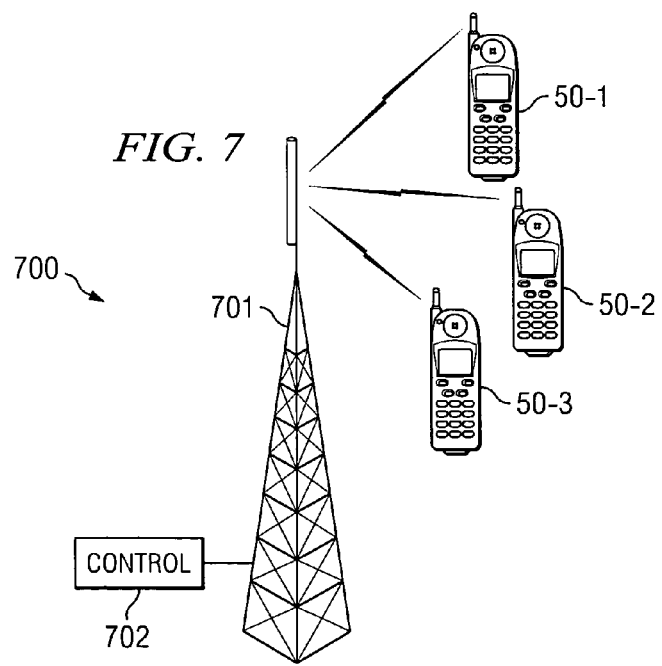

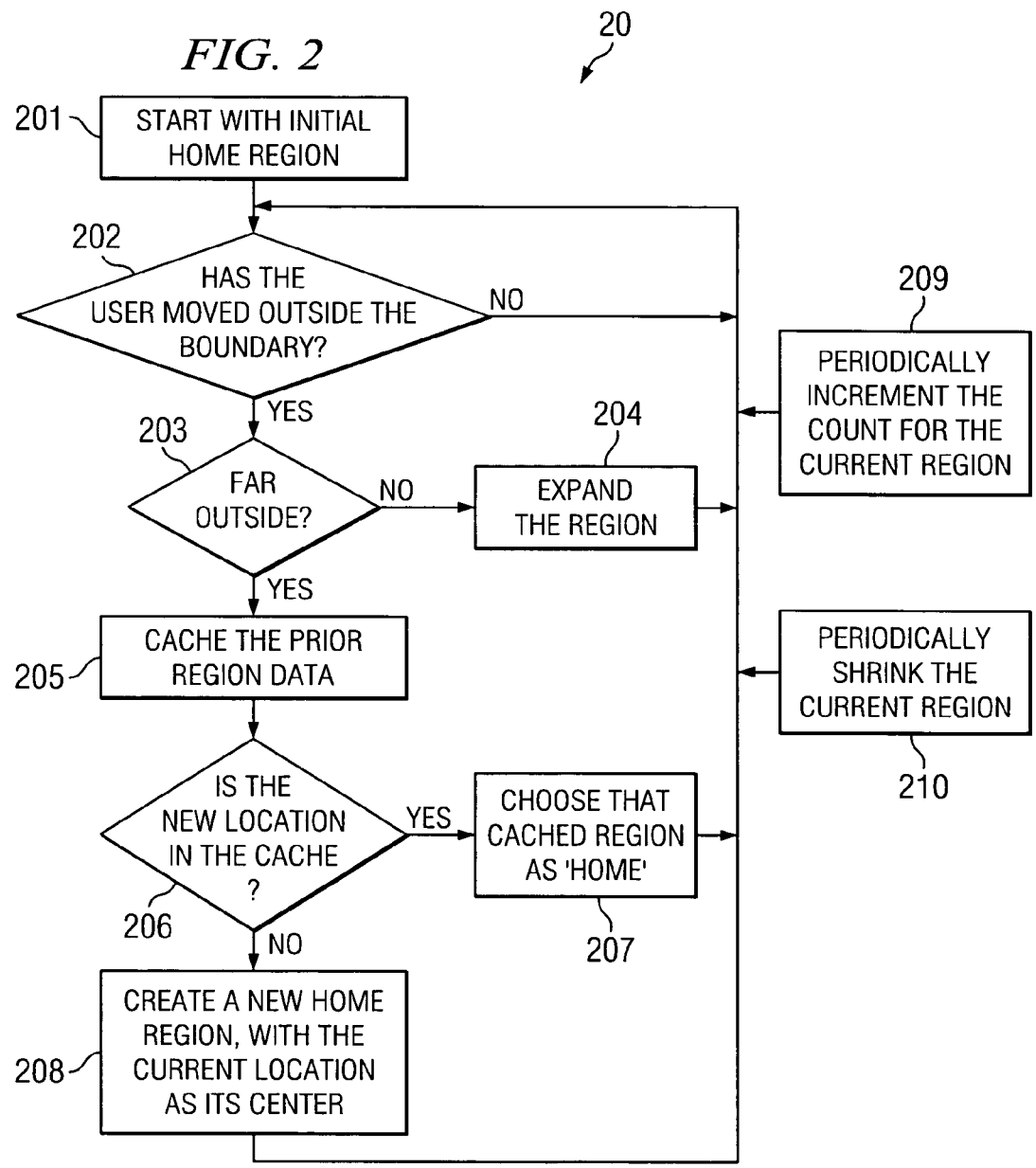

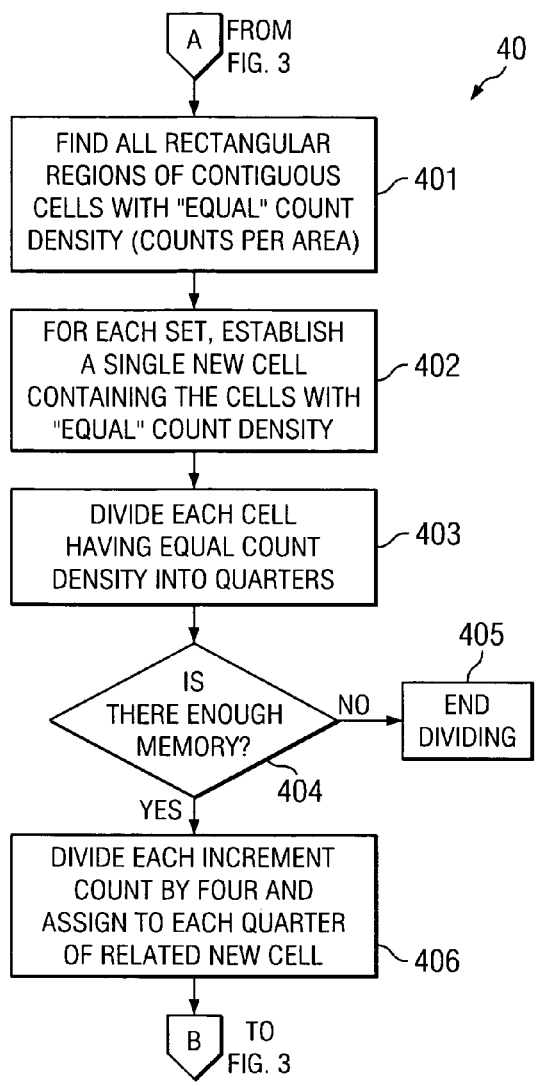
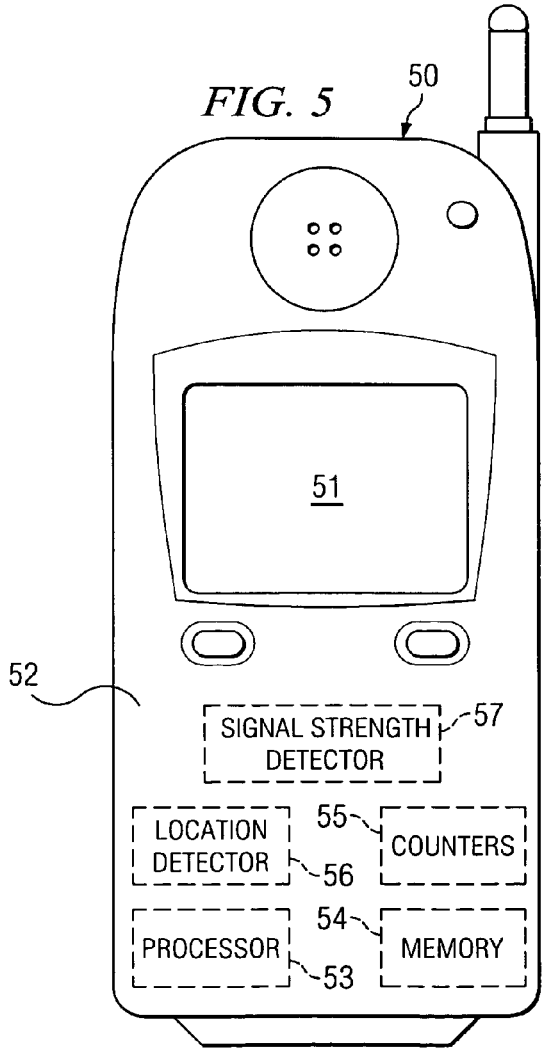

SYSTEM AND METHOD FOR WIRELESS COVERAGE DETECTION

TECHNICAL FIELD

This disclosure relates to wireless coverage detection and more particularly to systems and methods for using mobile devices for detecting the boundary of a measurable phenomenon, such as the signal quality of RF broadcasts.

BACKGROUND OF THE INVENTION

Providers of wireless services, such as, for example, cellular telephone service, currently detect holes in their coverage in two ways, drive testing throughout the coverage area and customers calling to report problems. One disadvantage of drive testing is that the RF field is undersampled in time, since each sample covers only a fraction of a second per month at any one location. Another disadvantage of drive testing is that the RF field is also undersampled in space, because most of the major roads are not driven their entire length and only some of the minor roads are driven. Drive testing misses all locations without a road, such as parks, stadiums, homes, offices, conference centers, etc. While drive testing attempts to weigh the samples by their importance (making sure to cover major roads, for example) this weighing is subjective and ad hoc, and applies a single weighing for all customers. In addition, drive testing is labor-intensive and requires a truck full of expensive equipment. A disadvantage of having customers call in complaints is that such a system is subjective and undersamples the signal even more seriously than does drive testing, both in time and space. In addition, called-in information is usually imprecise and it is also labor-intensive to record the called-in data.

BRIEF SUMMARY OF THE INVENTION

In one embodiment there is shown a system and method for determining the spatial boundary of measurable phenomenon, such as the quality of a broadcast signal at various locations within geographical areas covered by the broadcast signal. Data representing relative signal quality at various locations within the geographical area is created within a mobile device, such as a cell phone capable of receiving the broadcast signals. The data is stored, and refined, within the device so as to define weak signal quality areas within at least a portion of the geographical area traveled by the mobile device. The data stored within the mobile device is from time to time communicated to the central broadcast system. The refinement of the data in the device allows for long storage periods so that signal quality can be reported over long time spans. By collecting such data from a plurality of such devices, the central system can map the signal strength over the entire geographical area.

BRIEF DESCRIPTION OF THE DRAWINGS

FIG. 1A shows geographical areas defined by a mobile device;

FIGS. 1B, 1C, and 1D show movement, expansion and contraction of the geographical area of FIG. 1;

FIGS. 2, 3, and 4 show flow charts of one embodiment of system operations;

FIG. 5 shows one embodiment of a mobile device;

FIG. 7 shows one embodiment of a cellular system using the systems and methods described herein.

DETAILED DESCRIPTION OF THE INVENTION

Figure 3:
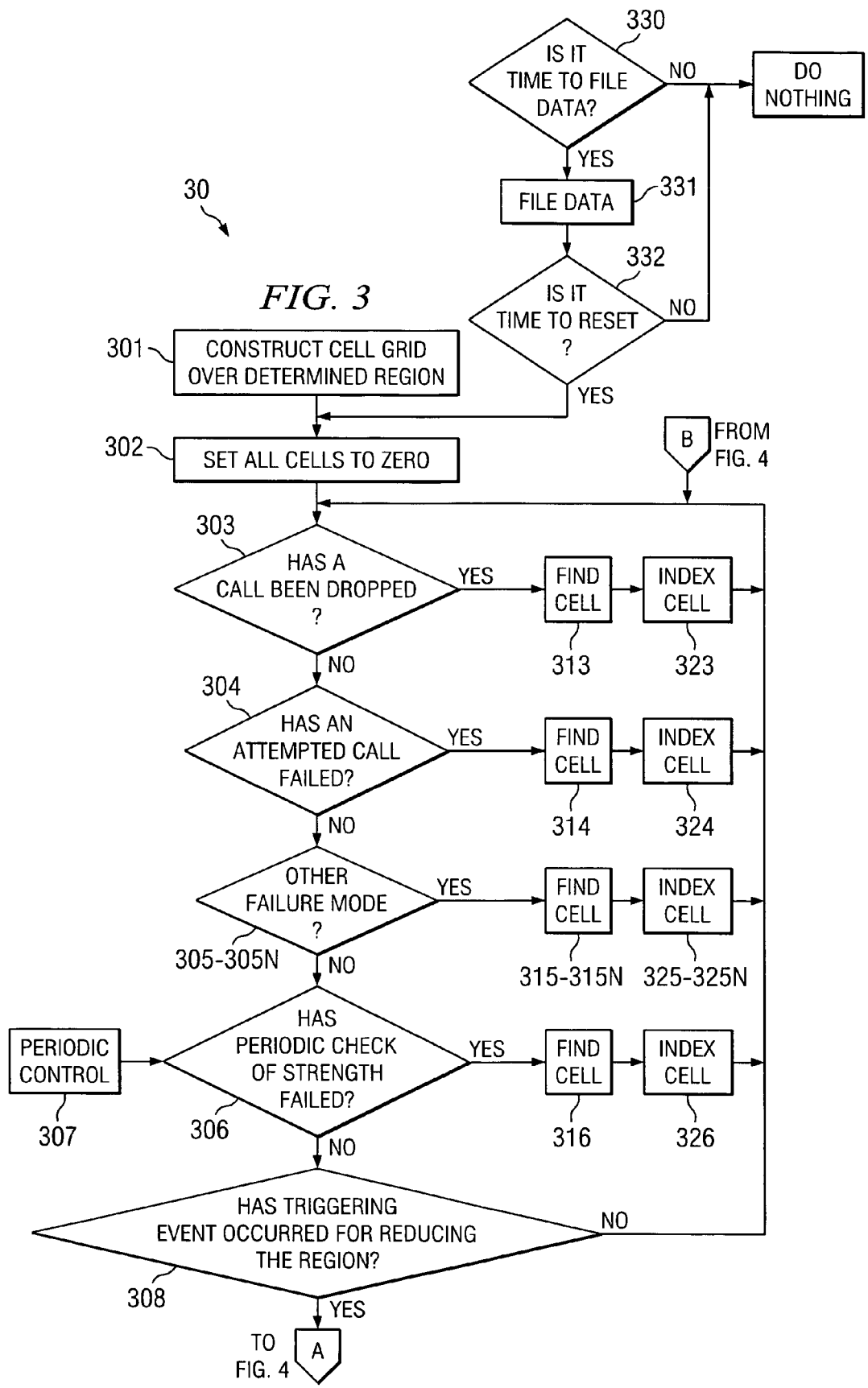

FIG. 1A shows geographical area 11 where the user of a mobile device (for example, a cellular telephone) spends most of his/her time. The letter 'A' is positioned at the center of geographical area 11. For discussion purposes, this is called the 'home' region and in discussing FIGS. 1A-1D the method discussed with respect to FIG. 2 will be used.

Assume now that the user moves a little bit and spends his/her time in region 12 shown with a 'B' at its center. In this situation region 11 will expand. FIG. 1B shows the expanded region 13. In FIG. 1B the new home region has expanded on the north and east.

The expansion amount could be by just enough to include the user's new location or could be by an integral number of bins (cells), or by doubling the original size, etc.

FIG. 1C shows an example where the user remains within the confines of region 12 and, periodically, as will be discussed hereinafter, the region is reduced. For discussion purposes herein it should be noted that acts performed periodically can be performed at regular intervals or at random intervals. In this example, region 12 is reduced on all sides to form region 14.

FIG. 1D shows that the home region, now region 15, has again been expanded on the north and east to include areas of user movement. The home region now includes the new areas of user movement, and omits the areas where the user no longer goes. The home region has effectively moved to follow the user from A to B.

When the user goes far outside the home region (e.g., flies somewhere), the coordinates (and the data associated with the coordinates) are cached (home coordinate cache) and a new temporary region is created.

In addition, the system periodically increments a count associated with the region the user is currently in and periodically deletes from the cache the region with the smallest count. When one region count exceeds some threshold, the system has established a home region. Using this method, the system establishes which cached region is the user's home region. There may be a tie, or a near-tie, for first place, depending on the usage pattern. However, this does not matter since the important thing is to choose a region where the user spends a lot of time. In the embodiment shown, it takes four numbers to store the bin information. The numbers may be, for example, latitude/longitude, or distance (in bins, or some other unit) plus an angle from a known tower, or some other coordinate system (which need not be Cartesian).

By using more numbers: five (2 locations+angle) for a rotated rectangle, six for a triangle, eight for an arbitrary quadrilateral, etc. less restrictive region boundaries can be accommodated. To appreciate the value of less restrictive representations, imagine trying to represent a highway 100 feet wide and 20 miles long, running at a 45° angle. If the rectangle must have horizontal and vertical sides, it will be 14 miles on a side. If the system allows it to be rotated 45°, it only needs to be 100 feet on one side. The cache size of the home coordinate cache (as discussed above) can be as small as desired, as long as it contains at least two elements. The larger the cache, the greater the chance of converging quickly on "home."

FIG. 2 shows one embodiment of a flowchart showing system and method 20 for determining the home region for storing data pertaining to signal strength. Process 201 starts with an initial home region. One embodiment for determining the home region is shown in FIG. 3 to be discussed hereinafter.

Process 202 determines whether the user has moved outside of the home region. If the user has moved outside the home region, process 203 determines if the user has moved beyond a given distance. If not, then the boundary is expanded via process 204 as discussed above. If the user has moved beyond a given distance, then the prior region's data is stored in a cache via process 205. Process 206 then determines if the new location is in cache. If so, that cached region becomes the new home region. If not, then process 208 creates a new home region.

Process 209 periodically increments the count for the current region and process 210 periodically shrinks the current region. Either or both of these actions can be incremented periodically, such as every minute (hour), (day), etc., as desired. While uniform shrinking is discussed, an important factor is that shrinkage (whether uniform or nonuniform) is unbiased over the long run. Thus, the shrinkage need not be uniform across the region, and one side could be reduced at one time and a different side reduced at another time. The side or sides to be reduced could be determined in order (north, south, east, west, etc.) or in random order, and any number of sides can be reduced at a time.

As discussed above, this system will continually refine itself so that if a user has moved to a new home region, the new home region will soon become the official home region and the system will continue without anything being done by either the user or the central system to which the device will eventually report. In addition, as discussed above, the size of the area will continually refine downward (or upward) so that as the user's movements reduce (or increase) the home region also reduces (or increases).

FIG. 3 shows one embodiment 30 of a system and method for constructing a grid of cells describing the measurement of the phenomenon, for example, quality of wireless coverage. Process 301 constructs a cell grid over the region where the user presently is located. This cell grid can be as fine as memory will allow. Note that the memory can be different for different mobile devices, and thus, the size of grid area or the refinement therein can be different. Process 302 sets all cells to 0 initially. Processes 303 to 306 are several examples of a defined "bad" cell. In this context "bad" can be defined in any manner subjectively observable by the device and generally pertains to the quality of the signal. No signal is the ultimate bad quality. If desired, different levels of severity can cause a cell's count to be incremented more than once. Thus a dropped call is one example of a "bad" reading. If desired, bad readings can be graded such that a dropped call can be, say, the equivalent of two low RF signal readings, while other factors only give rise to a single incremented count.

Process 303 determines if a call has been dropped. If so, process 313 determines the cell where the dropped call occurred and an incremented count is made in that cell via process 323. As discussed, this increment would be, for example, a 1 added to the cell to show that a call has been dropped in that cell by this device. Again, note that this information is maintained in the device itself, and is not, at this point, communicated to the central system.

Process 304 determines whether an attempted call has failed, if it has, process 314 finds which cell the call was attempted from. That cell is incremented via process 324.

Process 305 to 305N checks for other failure modes and the proper cells are located and incremented via processes 315 to 315N and 325 to 325N.

Process 306 checks to see if a periodic check of strength has failed, and if so, then process 316 finds which cell the signal strength has failed in and process 326 increments that cell. Process 306 works under periodic control of process 307 and can, if desired, be under random control, or triggered by external signals or any other manner desired.

Process 308 determines whether a triggering event for reducing the region has occurred. If it has, then system and method 40, shown in FIG. 4 is entered and, as will be discussed in more detail hereinafter, operates to reduce the memory required for the active region so that more data can be stored for faulty cells.

Process 330, FIG. 3, determines if it is time to file the data with the central system. If it is, then data, via process 331, is transferred from the cell phone to the central system. This transfer can occur periodically, randomly, or on command from the central system as will be discussed, this time can be once a year, or every several months, or sooner as desired. At some point in time, it may be proper to reset the cells to 0. If so, then the system triggers process 302 and system and method 30 will repeat.

Note that for processes 313, 314, 315 and 316 if the mobile device cannot determine its location, it does nothing.

FIG. 4 shows one embodiment 40 of a system and method for refining the boundary of the region of poor coverage, by giving cells not on the boundary coarse granularity, and cells on the boundary fine granularity. Processes 401-402 control coarse granularity with respect to adjacent cells which have approximately equal density of counts per unit area. These approximately equal cells are merged into a single cell, and the cell's count is set equal to the sum of the counts of the merged cells. Note that this process frees up memory, which is used in later steps. There is, in general, more than one solution. For example, if there is an L-shaped region of equal density, a decision must be made with respect to the corner belonging to the vertical or the horizontal piece. Any choice can be made here, as long as the merged regions are rectangular.

Similarly, any reasonable interpretation of 'equal' will work—exactly equal, within "n" counts/area, within "n" percent, etc. Thus, a user can decide how to design the system and method to take into account the desired interpretation of "all cells are equal": (i.e.) the difference between neighbors is small, the difference between max and min is small, the difference between max and average is small, etc. Again, any method can be chosen, but it is good practice to use the difference between max and min; otherwise the method could be fooled by a smooth gradient.

Processes 403-406 control fine granularity. Process 403 divides each cell whose density is not "equal" to that of its neighbors into four cells. This uses the memory which was freed in the previous step. If there is not enough memory, as determined by process 404 to do this step, then division is ended as shown in process 403.

Process 406 assigns a count to each new cell created in process 403. The count is chosen as follows. Assume the original cell's count is C.

(1) If C<4, then set p=C/4, and set each new cell's count to 1 with probability p, and 0 with probability 1−p.
(2) If C is exactly divisible by 4, then set each new cell's count to C/4.

(3) Otherwise, let R be the remainder C mod 4, and let S=C−R. S is now exactly divisible by 4. Proceed as in step (1) with R and as in step (2) with S.

The system then repeats processing as in FIG. 3.

The above is but one embodiment for dividing the region near the boundary into smaller cells and partitioning the counts fairly. Any other method of representing the region as a hierarchic collection of variable-sized rectangles will also serve to keep the memory requirements approximately constant while providing detail near the boundary. For example, see Samet, H., 1988 "Hierarchical representation of collections of small rectangles." ACM Computing Surveys Vol. 20 No. 4, 271-309.

FIG. 5 shows one example of a hand-held device 50. In the example, device 50 is a cellular phone having display 51, location detector 56, signal strength detector 57, processor 53, memory 54 and counters 55. Some or all of these elements may not be necessary or can be combined into one or more as desired. Note that the mobile device can be any type of device designed to receive wireless broadcast signals, such as, for example cell phones, PDAs, navigation systems, computers, vehicle control processors, etc.

FIG. 6A through FIG. 6E show steps that, by way of example, illustrate how cells are coalesced and split.

Figure 6A:
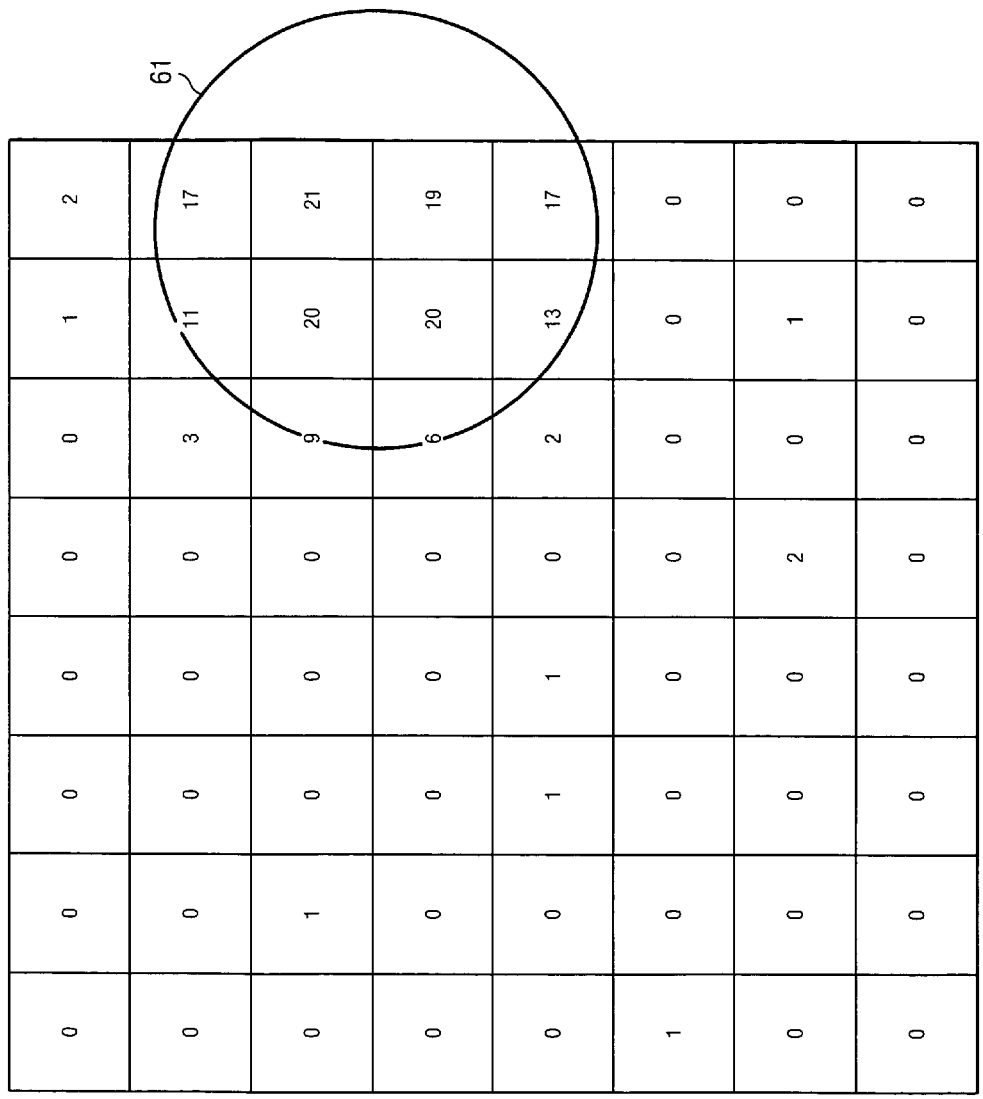
FIGS. 6A, 6B, 6C, 6D and 6E show one embodiment of the steps for changing the size of cells.

Step 1, as shown in FIG. 6A, shows an initial division of the home region into a uniform grid. The area inside circle 61 has poor coverage, and the area outside has good coverage as shown by the number of "bad" counts in the respective cells. Thus, after some time has passed, the cells with poor coverage have relatively large counts, and those with good coverage have relatively small counts. This initial arrangement has 64 cells, which, for illustration, we assume is all that the available memory will permit. The boundary of the region of poor coverage is marked by cells (or cell boundaries) with a small count on one side and a large count on the other.

After some time, (which may be a timed interval, or when the largest count exceeds a threshold, or when the sum of counts exceeds a threshold), as shown by process 308, FIG. 3, the system coalesces the grid elements whose incremented count densities are equal to their neighbors' count densities. Unless the service is very bad, most count densities will be equal (in the sense discussed above) to zero, so many cells will collapse into one, and the space required in the device memory for storage of data will be much less than for the original grid. Accordingly, memory is freed up if there is a large good area or a large bad area. As will be seen, this free memory is consumed by constructing an image of the boundary between good and bad areas. In principle, the boundary can be arbitrarily detailed, as long as it fits the available memory.

Figure 6B:
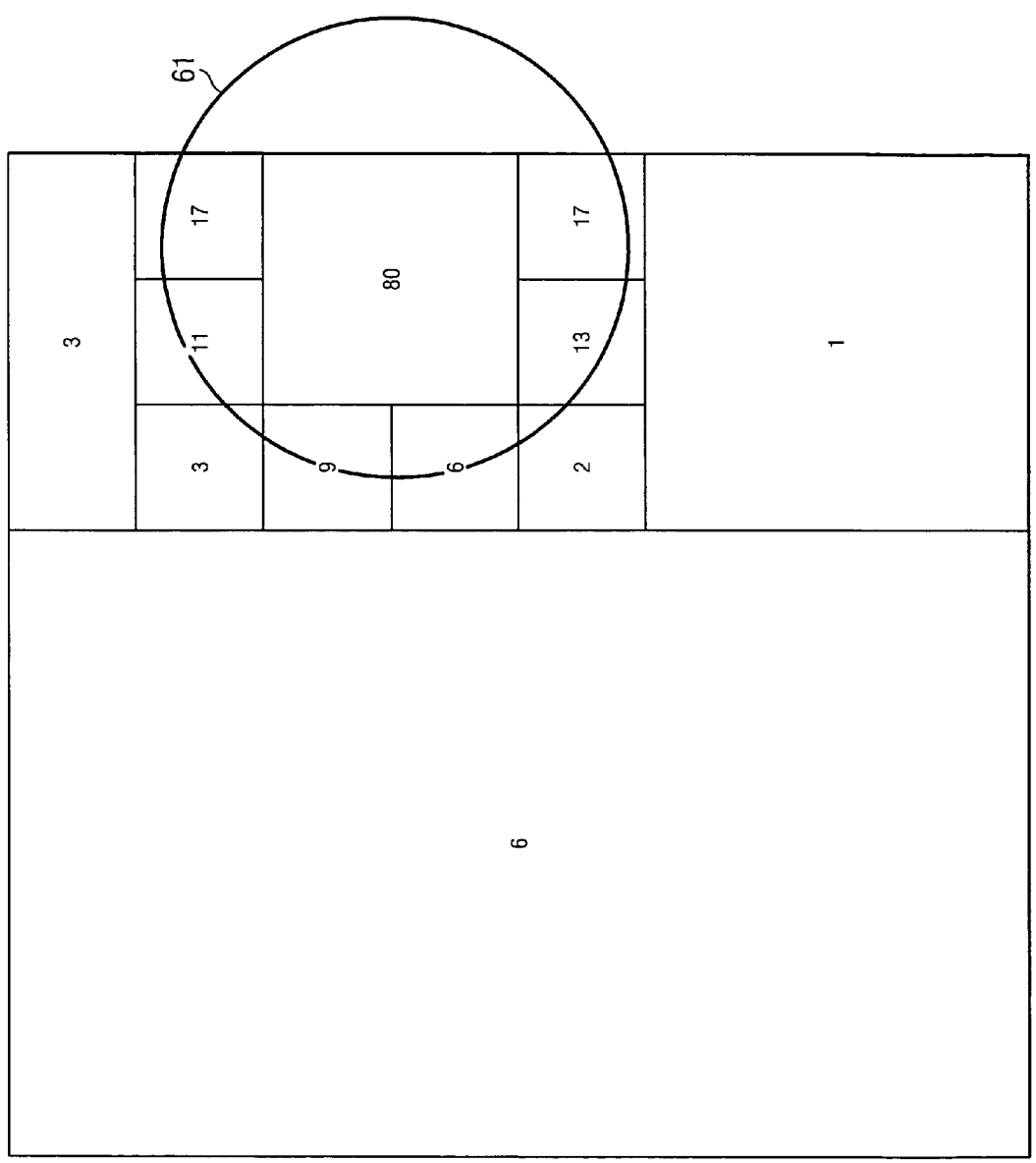

Step 2, as shown in FIG. 6B, shows the effect after coalescing neighboring cells which have 'equal' count density. In this example, cells within 2 of one another are considered equal. There are now 12 cells. Note that the four center cells within circle 61 (circle 61 being a spatial boundary of the measured phenomenon, a portion of which is outside the home region of this measuring device) having counts of 20, 21, 20 and 19 (80) have been reduced to a single cell having a count of 80 which is the sum of the original cells. Also note that all the non-boundary cells (cells not on the boundary of the circle) to the left of circle 61 are reduced to a single cell having a count of 6. Likewise, the three non-boundary cells (cells not on the boundary of the circle) above circle 61 are reduced to a single cell having a cell count of 3 while the nine non-boundary cells (cells not on the boundary of the circle) below circle 61 have been reduced to a single cell having a count of 1.

Figure 6C:
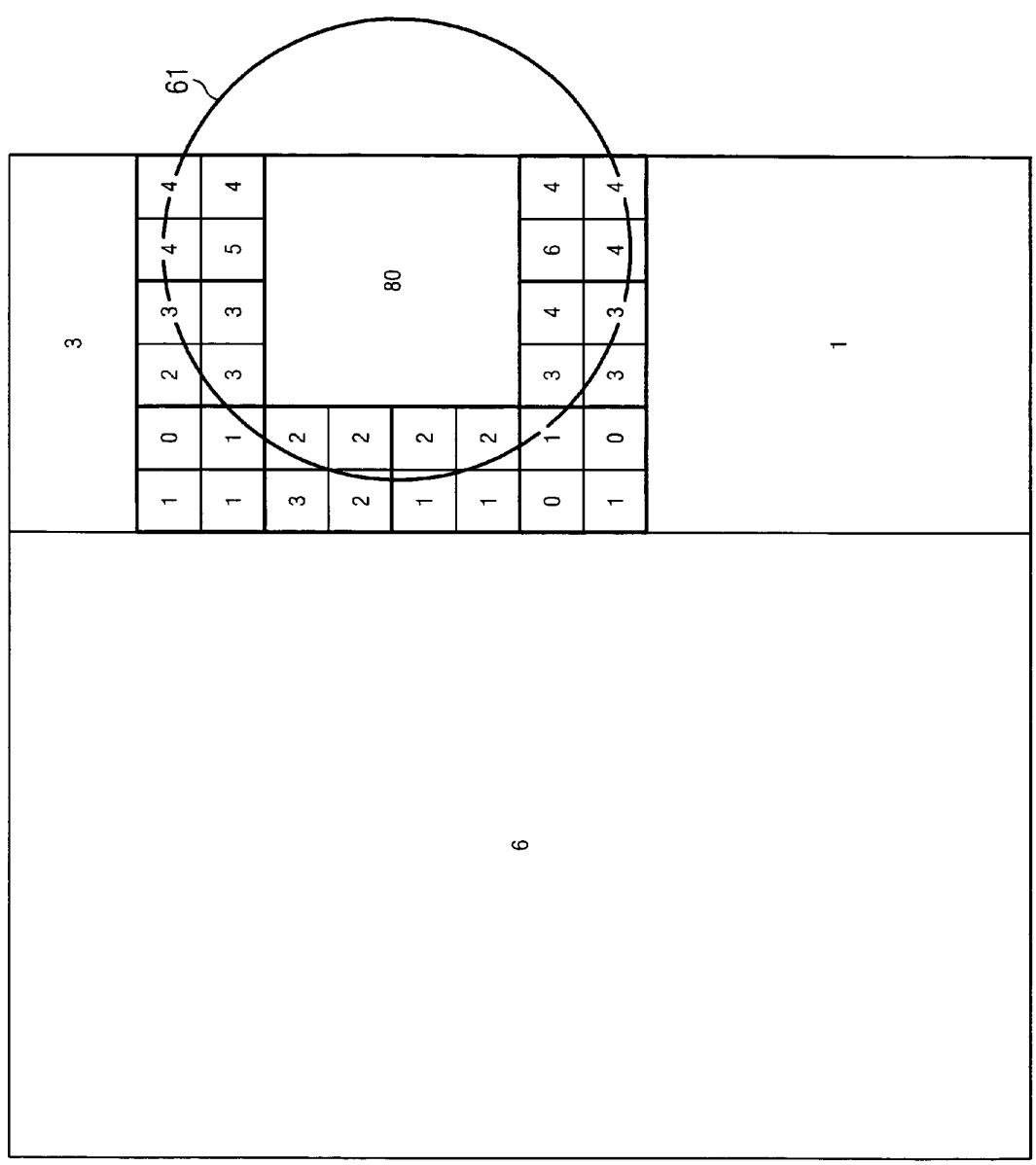

Step 3, as shown in FIG. 6C, shows the result after splitting those cells which were not coalesced with their neighbors. There are now 36 cells based upon a 4 for 1 split of each coalesced cell. The boundary of the region of poor coverage is marked as in Step 1, but since those cells are now smaller, the boundary is determined more precisely.

Figure 6D:
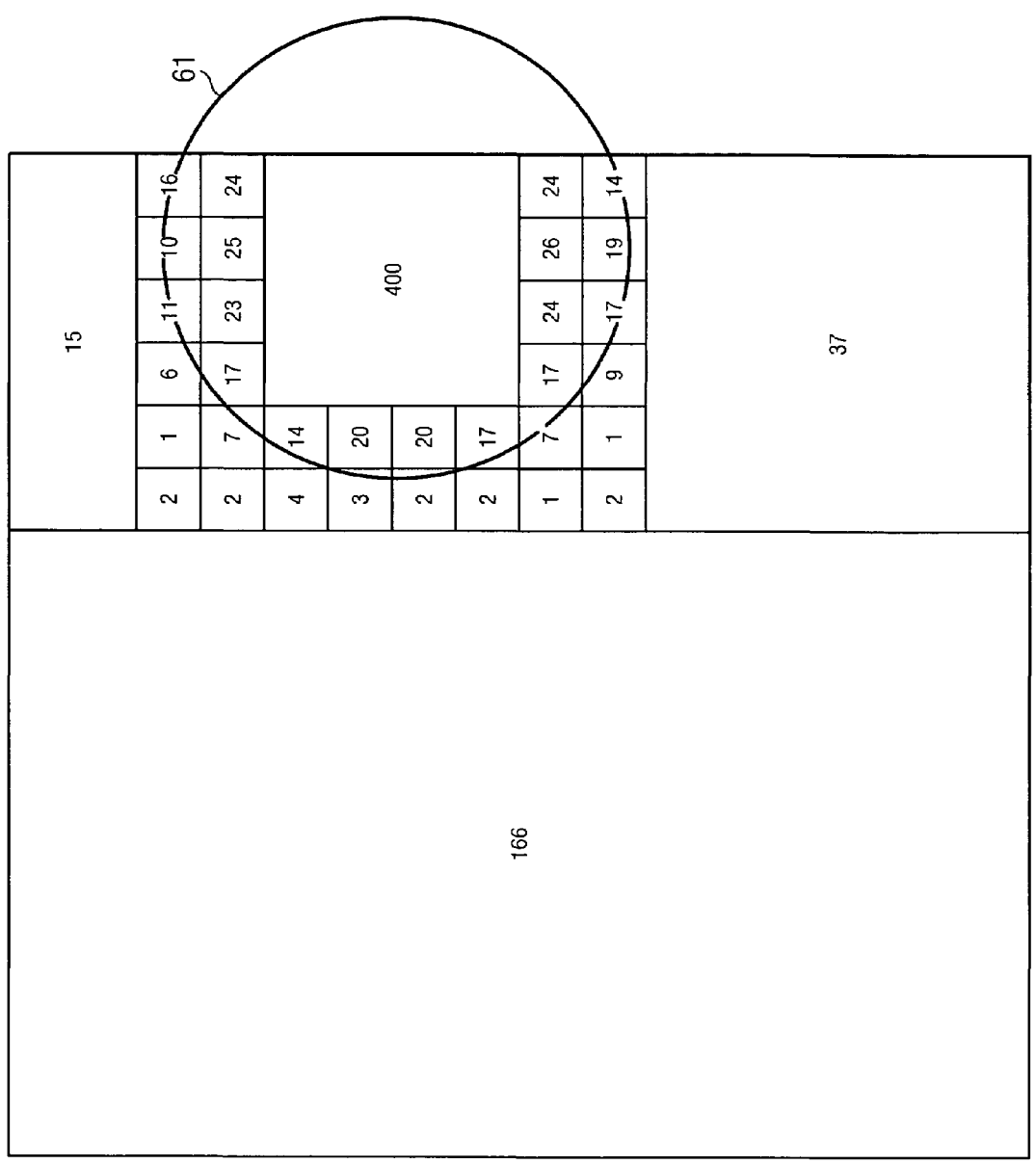

Step 4, as shown in FIG. 6D, shows the situation after the cells have been accumulating counts for some time. As would be expected, the cells in the area of poor coverage accumulate counts at a higher rate than do the cells in the better coverage areas.

Figure 6E:
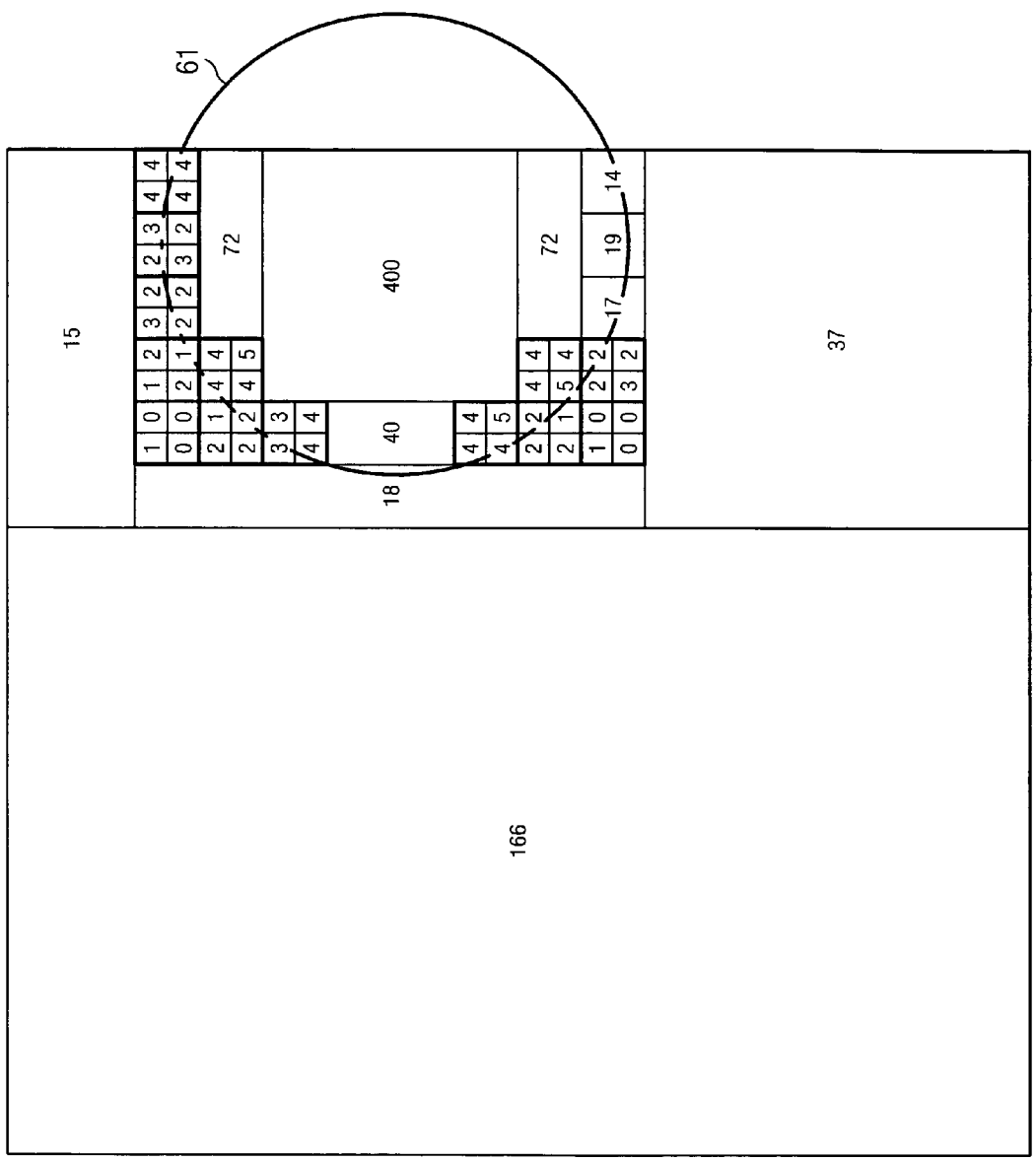

Step 5, as shown in FIG. 6E, shows the result after a second round of coalescing neighboring cells which have 'equal' count density, and then splitting the cells that remain. Note the three cells at the bottom of circle 61 which have not been split. There are 63 cells in this FIGURE; further splitting would require more memory than had been used (64) for the initial cell count (see step 1, FIG. 6A). (In step 1, the assumption is that the available memory has all been used). The algorithm stops splitting when there is insufficient memory to do so. The boundary of the region of poor coverage is still marked as in Step 1, but since those cells are now smaller, the boundary is determined even more precisely.

This process continues, stopped only by running out of memory, or by being restarted by process 332, FIG. 3. Note that as shown in FIGS. 6A-6E the boundary of the measured "bad" (or out of norm) phenomenon need not lie entirely within the region reported by the device. Thus, it may take several devices to properly describe the totality of the "bad" phenomenon.

Places where the signal quality is different at different altitudes are treated the same as places where the signal quality is different at different times; i.e. there will probably not be a consistent hole. If mobile devices know their location in three dimensions than the concept discussed in this patent can be generalized to three dimensions. This would only be practical if sufficient memory exists. However, since mobile phone locating methods do not work very well indoors or underground, three dimensions may not be practical. Note that a device may have been in a "bad" location many times and for one reason or another (for example, being turned off) not logged a "bad" signal.

FIG. 7 shows RF system 700 having RF communication tower 701 controlled by control system 702. In the embodiment shown, RF tower 701 is a cellular tower communicating to cell phones 50-1, 50-2 through 50-n. These cell phones are mobile and can thus move throughout the coverage area or to other areas. As they each move, they will each contain within the device the incremented numbers recorded according to the system and method discussed above. Periodically, this information will be communicated to control system 702 for the purpose of allowing the central system to then determine problems within the coverage areas based upon actually occurring criteria as determined from mobile devices in the course of their normal end-user usage. Note that the "home" region of each device is defined based upon that device's actual movements and thus each home region will be different. This difference then assures that the entire coverage area is monitored.

The system and method described will over time compute the boundary of regions where the device was unable to support a call and will do this within fixed memory limits in a hand-held wireless device. The device will devote almost no memory to regions where service is adequate. The process will be more memory-efficient if there are a few large holes as opposed to many small ones. The devices used, for example, the cellular phones, will be ones that are in the region naturally, because they are being used on a commercial network for which they were intended and not as a piece of extraneous test equipment. Thus, in the embodiment shown, a cellular telephone is being used to make and receive calls and the population of cell phone users (not any particular one cell phone user) will tend to go into every possible location within any cellular region. Thus, the actual end-user device defines the locations for making measurements, and the region is not limited to places where test equipment can go. This then yields more natural test results since it is based on actual user experience over a wide population.

A large portion of the device memory is spent storing counts of instances of poor service. The process is more accurate if it runs longer (assuming stationary service holes), but this requires larger counts, hence wider counters, hence more memory. If a user spends, say, 15 minutes a day in a coverage hole and the system samples every 10 seconds, then an 8-bit counter will overflow in 3 days. Morris, Robert "Counting Large Number Of Events In Small Registers" Communications of the ACM, Volume 21 Number 10, pp. 841-842, Oct. 1978, which is hereby incorporated by reference herein, developed a technique whereby the logarithm of the count can be stored (the technique does not require computing logarithms). The result is approximate, but since the system is sampling a continuous phenomenon, and "equal" is already approximate, it can accept an approximate count. Using the Morris method, and accepting a standard deviation of about 10%, an 8-bit counter's range can be extended to 4 years. One can use sub-byte counters, but this brings little benefit because the log function grows slowly. A 7-bit counter under these conditions will span just 3 weeks. This type of counter can also be used for the counts in the cache.

This process evolves an ever-more-detailed image of the boundary of coverage holes, in bounded memory and using only 1-byte counters. The two main aspects of determining coverage locations and determining holes could run concurrently or alternately, or by constantly updating the counts in the cache, perhaps at a slower rate once the system has calculated a home location. Updating home location is necessary because the system might have made a wrong choice, or the user's behavior may have changed.

The concepts taught herein can be used for detecting the boundary of any phenomenon, as long as it's fairly stationary and mobile devices can detect that phenomenon. For example, a determination can be made of where there's a lot of background noise; where traffic consistently speeds up or slows down; the level of smog (if smog sensors are placed on mobile devices) or sunlight (if correction is made for time of day), etc. Also, while a cellular system has been described, the concepts taught herein could be used for any type of communication or broadcast transmission system, including, by way of example, WIFI, Internet and wireless computing, radar, and sensor.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for determining the spatial boundary of broadcast signal reception quality at various locations within geographical areas; said method comprising:
    measuring relative quality of certain of said broadcast signal reception quality at a defined region within said geographical area, said measuring occurring within a mobile device and resulting in measured data; said defined region being defined by the movement of said mobile device; and
    maintaining within said device said measured data so as to define poor quality areas within at least a portion of said defined region, wherein said maintaining comprises storing within data cells instances of poor quality locations within said defined region and from time to time reassessing said data cells, wherein said reassessing comprises reprocessing to collapse measured data stored within said device so that certain of said data cells form a single data cell,
    wherein said measured data is a count of poor signal quality maintained individually for a plurality of location cells within said geographical area, and wherein said device increments said bad signal count with respect to the cell location of said experienced poor quality whenever said device experiences an instance of poor quality.

2. The method of claim 1 further comprising:
    from time to time redefining said defined region for each said mobile device.

3. The method of claim 1 wherein said reassessing further comprises splitting certain data cells to form several data cells.

4. The method of claim 1 wherein said reprocessing to collapse comprises combining those cells whose count density of instances of poor quality are approximately equal.

5. The method of claim 1 wherein said device is an end-user device.

6. The method of claim 5 wherein said end-user device is a cellular telephone.

7. The method of claim 1 further comprising:
    communicating defined ones of said poor quality areas from said device to a control system.

8. The method of claim 7 wherein the time span between said communicating is at least one day.

9. The method of claim 1 wherein said defined region is redefined based on the physical areas visited by said device.

10. The method of claim 1 wherein said defined region is a determined home area of said device.

11. The method of claim 1 wherein said measured data is a count of bad quality at various locations within said geographical area over a period of time.

12. The method of claim 1 wherein said poor signal quality is determined by at least one criterion from the group consisting of:
    (a) signal strength at periodic intervals, (b) in a communication system whenever a connection is dropped, and (c) whenever the user tries to establish a communication connection and fails.

13. A hand-held mobile device for receiving wireless signals, said device comprising:
- a poor signal quality indicator;
- a location detector;
- memory for storing poor signal quality indications corresponding to a plurality of detected locations; and
- a processor for collapsing certain of said locations within said device into a single location, said collapsing combining those locations whose incremented count densities are approximately equal,
- wherein said processor is further operable for splitting certain of said locations into multiple locations, said split certain cells being cells on the boundary of said poor signal quality indications.

14. The hand-held mobile device of claim 13 wherein said device is one selected from the list of: cellular telephones, PDAs, computers, navigation systems, consumer devices, vehicle control processors.

15. The hand-held mobile device of claim 13 wherein said poor signal quality indications are determined based upon at least one of the following occurring with respect to said device:
  (a) low signal strength at periodic intervals, (b) dropping of a connection, and (c) failed connection attempt.

16. The hand-held mobile device of claim 13 wherein said poor signal quality indication is an incremented count maintained within said device on a location by location basis, said locations being actual locations of each said device at the time said indication is incremented.

17. The hand-held mobile device of claim 16 wherein said incremented count is controlled by a logarithmic counter within said device.

18. The hand-held mobile device of claim 16 wherein said incremented count is organized as a quadtree.

19. The hand-held mobile device of claim 13 further comprising:
- a transmitter within said device for sending from time to time said poor signal quality indications for at least one of said detected locations to a control point external to said device.

20. The hand-held mobile device of claim 13 further comprising:
- storage for holding data from one geographical area while said device is in a different geographical area.

21. A cellular system for providing wireless communication to a plurality of wireless devices, said system comprising:
- means for providing at least one source of wireless RF transmission broadcast over a widespread geographical area to a plurality of said wireless devices;
- means for accepting from a plurality of said wireless devices data collected and stored by each said wireless device over a period of time, said data pertaining to locations of poor signal quality determined by said wireless device, said locations being within an area defined by each of said wireless devices;
- means for determining from accepted data from a plurality of said wireless devices at least one boundary of said poor signal quality wherein no one of said wireless devices need collect all of the data necessary to determine said boundary; and
- means for coalescing certain of said locations within each said device, and means for splitting other of said locations within each said device.

22. The cellular system of claim 21, further comprising:
- means for redefining said area defined by each of said wireless devices, said redefining dependent upon the actual geographical area traveled by a user of said device.

* * * * *